United States Patent
Arya

(10) Patent No.: US 7,535,678 B2
(45) Date of Patent: May 19, 2009

(54) METHOD AND SYSTEM FOR UTILIZING FLEXIBLE MEMBERS IN A HEAD GIMBAL ASSEMBLY TO REDUCE IMPACT OF OPERATIONAL DISTURBANCES OF SLIDER FLYING HEIGHT

(75) Inventor: Satya Prakash Arya, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 417 days.

(21) Appl. No.: 11/329,497

(22) Filed: Jan. 10, 2006

(65) Prior Publication Data

US 2007/0159727 A1 Jul. 12, 2007

(51) Int. Cl.
G11B 5/48 (2006.01)
G11B 21/21 (2006.01)

(52) U.S. Cl. .................... 360/245.7; 360/245.9

(58) Field of Classification Search ..... 360/244.2–245.9
See application file for complete search history.

(56) References Cited

U.S. PATENT DOCUMENTS

| 5,757,585 | A |   | 5/1998  | Aoyagi et al.   |         |
|-----------|---|---|---------|-----------------|---------|
| 5,781,379 | A |   | 7/1998  | Erpelding et al.|         |
| 5,818,662 | A |   | 10/1998 | Shum            |         |
| 5,862,010 | A |   | 1/1999  | Simmons et al.  |         |
| 5,883,759 | A |   | 3/1999  | Schulz          |         |
| 5,892,637 | A | * | 4/1999  | Brooks et al.   | 360/234.5 |
| 5,933,293 | A |   | 8/1999  | Bennin          |         |
| 5,955,176 | A |   | 9/1999  | Erpelding et al.|         |
| 5,956,209 | A |   | 9/1999  | Shum            |         |
| 5,986,853 | A | * | 11/1999 | Simmons et al.  | 360/245.9 |
| 6,052,258 | A | * | 4/2000  | Albrecht et al. | 360/245.2 |
| 6,055,132 | A |   | 4/2000  | Arya et al.     |         |
| 6,282,064 | B1|   | 8/2001  | Palmer et al.   |         |
| 6,382,499 | B1|   | 5/2002  | Satoh et al.    |         |
| 6,388,201 | B2|   | 5/2002  | Yamato et al.   |         |
| 6,459,549 | B1|   | 10/2002 | Tsuchiya et al. |         |
| 6,596,184 | B1|   | 7/2003  | Shum et al.     |         |
| 6,697,228 | B1|   | 2/2004  | Mei et al.      |         |
| 6,965,501 | B1| * | 11/2005 | Pan et al.      | 360/245.7 |
| 7,137,187 | B2| * | 11/2006 | Pan et al.      | 29/603.03 |
| 7,317,595 | B2| * | 1/2008  | Tsuchida et al. | 360/245.3 |
| 2003/0070834 | A1 |   | 4/2003 | Tsuchiya et al. |     |
| 2003/0133226 | A1 |   | 7/2003 | Shang           |     |
| 2003/0227718 | A1 | * | 12/2003 | Ishikawa       | 360/244.2 |
| 2004/0008449 | A1 | * | 1/2004 | Girard          | 360/245.7 |
| 2004/0027725 | A1 |   | 2/2004 | Pan et al.      |     |

(Continued)

FOREIGN PATENT DOCUMENTS

JP 9251627 9/1997

*Primary Examiner*—William J Klimowicz

(57) ABSTRACT

A method and system for utilizing flexible members to reduce an operational disturbance between a slider and a flexure nose portion of a head gimbal assembly is disclosed. The method provides a slider coupled with a gimbal structure of the head gimbal assembly, the slider having a read/write head element with lead terminals thereon. The method further provides a flexure nose portion coupled with the gimbal structure. A gimbal window is provided in a stainless steel layer, the gimbal window located between the slider and the flexure nose portion on the gimbal structure. A flexible member is utilized at the gimbal window for coupling the slider and the gimbal structure, the flexible member for reducing an operational disturbance passed from the slider to the flexure nose portion of the gimbal structure.

17 Claims, 5 Drawing Sheets

U.S. PATENT DOCUMENTS

2005/0099730 A1* 5/2005 Motonishi et al. ........ 360/244.2
2005/0275971 A1* 12/2005 Kuroki et al. ............ 360/244.2
2006/0227464 A1* 10/2006 Huang et al. ............. 360/245.3
2006/0274453 A1* 12/2006 Arya ....................... 360/245.3
2006/0274454 A1* 12/2006 Arya ....................... 360/245.6
2007/0076327 A1* 4/2007 Yang et al. ............... 360/294.4

* cited by examiner

BACKGROUND

METHOD AND SYSTEM FOR UTILIZING FLEXIBLE MEMBERS IN A HEAD GIMBAL ASSEMBLY TO REDUCE IMPACT OF OPERATIONAL DISTURBANCES OF SLIDER FLYING HEIGHT

TECHNICAL FIELD

The present invention relates to the field of hard disk drive development, and more particularly to a method and system for utilizing head gimbal assembly flexible members to reduce impact of operational disturbances on slider flying height.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a hard storage disk that spins at a standard rotational speed. An actuator moves a magnetic read/write head over the disk. The actuator arm carries a head gimbal assembly (HGA) that includes a slider and a suspension with a nose portion for directly contacting a ramp used during the load and unload cycles for a load/unload drive. The slider carries a head assembly that includes a magnetic read/write transducer or head for reading/writing information to or from any desired location on the disk.

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters 3.5 to 1 inches (and even smaller 0.8 inch). Advances in magnetic recording are also primary reasons for the reduction in size.

However, the decreased track spacing and the overall reduction in HDD component size and weight in collusion with the load/unload drive capabilities have resulted in problems with respect to the HGA in general and the slider suspension in particular. Specifically, as the component sizes shrink, a need for tighter aerial density arises. In other words, the HGA is brought physically closer to the magnetic media. In some cases, the HGA will reach "ground zero" or contact recording. However, one of the major problems with near contact recording is the effect of vibration resonance when a slider encounters the asperities of the magnetic media or disk.

For example, when the slider contacts the disk, dynamic coupling between the slider and components of the head gimbal assembly (including the gimbal structure and nose portion) make the interface unstable and generate a strong or even a sustained slider (or even HGA) vibration. The vibration will result in slider flying high for some period of time and than returning to normal fly height as the vibrations reduce below a threshold. This phenomenon is known as fly height hysteresis. When slider is flying higher than normal, the read/write performance is degraded. This problem is particularly egregious in the load/unload drives with smaller sliders like Femto. The cantilever design nose limiter extending from the flexure (referred to herein as flexure nose) above the slider provides an additional moment arm thereby increasing the HGA vibration which is not damped by smaller slider ABS. At high altitudes, after a disk contact, the slider may never comeback to normal fly height.

Background FIG. 1 shows a bottom view of a background head gimbal assembly (HGA) 100. HGA 100 includes a slider 129 and gimbal structure (e.g., flexure) 329. The gimbal structure 329 includes a flexure tongue 317, a front limiter bar 316, two flexible legs 342, electric leads 341 and a flexure nose limiter 210. As is known in the art, gimbal structure 329 is utilized to flexibly suspend the head supporting slider 129 from the load beam 128. In general, the flexibility of the gimbal structure allows the slider 129 to remain flexible while flying above the disk 115. In so doing, the slider 129 will maintain a correct attitude over the disk 115 allowing the head 220 (of FIG. 1) to remain in correct alignment with the disk 115 such that the read/write capabilities of the head 220 remain constant.

Flexure nose limiter 210 is utilized during unload times of the disk drive. That is, when the electrical lead suspension (ELS) 127 is moved to a secure off-disk location on L/UL ramp 197 during non-operation, the flexure nose limiter 210 is utilized in conjunction with a staging platform to reduce unwanted motion of the gimbal structure 329. For example, on a HDD having a plurality of ELS 127, and therefore a plurality of HGA 100, during the unload state there is a need to support the gimbal structure 329 such that the sliders will not contact each other during movement of the HDD, or when the HDD experiences a shock event. By utilizing a staging platform having intimate contact with the flexure nose limiter 210, and a front limiter 315 contact with the front limiter bar 316, the deleterious movement of the gimbal structure 329 during unload times is greatly reduced. The front limiter 315, the flexure nose limiter 210 and its associated staging platform (L/UL ramp 197) are well known in the art.

Referring again to background FIG. 1, a narrow width long window 270 is provided for termination of the electric leads 341 to the slider. After solder termination of the electric leads 341 to the slider these leads are practically rigid due to very small free length left. Major portion of these electric leads 341 near the slider is held rigidly attached to the stainless steel layer. Also, the flexure nose limiter 210 is small in width at the base and has a very small window 275 in stainless steel. Very small window 275 is separated from narrow width long window 270 by rigid bridge 230. Rigid bridge 230 comprises the stainless steel layer. This background configuration of the gimbal and nose design has a rigid connection between the slider and flexure gimbal and nose that results in amplifying the vibration amplitude caused by disturbances like slider to disk contact, into a resonance resulting in sustained abnormal flying of the slider.

With reference still to background FIG. 1, in one embodiment, during normal operation of the HDD, operational disturbances such as contact between the slider 129 and the disk 115 occur. As stated herein, one of the major problems with the background is intermittent contact of the slider 129 inducing vibrations on the flexure nose limiter 210 of the HGA 100. For example, when the slider 129 encounters the magnetic media or disk 115. That is, when the slider 129 contacts the disk 115, dynamic coupling between the flexure nose limiter 210 and the slider 129 provides an unstable interface as well as generating a strong or even a sustained vibration resonance at the flexure nose limiter 210.

This problem is even more pronounced since the flexure nose limiter 210 extending from the gimbal structure 329 provides an additional moment to the HGA 100 thereby increasing the vibration characteristics between the slider 129 and the gimbal structure 329. In other words, when the flexure nose limiter 210 begins to vibrate the additional mass and moment help maintain the vibration (e.g., reaching a harmonic state) of the flexure nose limiter 210. Generally, a very small energy can keep the vibration sustained for a prolonged length of time such that the read/write capabilities and the interface reliability are significantly impacted. That is, the flexure nose limiter 210 vibration will result in slider 129 flying high thereby degrading read/write performance, or resulting in the slider/disk interface failure. It also limits the ability to achieve the lower flying height required for higher recording density.

One effective method of resolving the flexure nose vibration resonance includes adding of external viscoelastic dampening material in the flexure nose and the flexure gimbal areas of the suspension. However, although the addition of damping material at the point of high strain is an effective solution, it also adds additional cost and time to the manufacturing of the suspension.

SUMMARY

A method and system for utilizing flexible members to reduce impact of operational disturbances on flying height of a slider is disclosed. The method provides a slider coupled with a gimbal structure of the head gimbal assembly, the slider having a read/write head element with lead terminals thereon. The method further provides a wider flexure nose portion coupled with the gimbal structure. A large gimbal window is provided in a stainless steel layer of the flexure between slider and gimbal nose limiter. With the rigid stainless steel removed, the flexible members in the gimbal window provide a flexible coupling between the slider and the gimbal structure. The connecting flexible members reduce, instead of magnifying, an operational disturbance passed from the slider to the flexure nose and the remaining gimbal structure.

BRIEF DESCRIPTION OF THE DRAWINGS

Background

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of an electrical lead suspension (ELS) in conjunction with its operation within a hard disk drive and components connected therewith. The discussion will then focus on embodiments of a method and system for utilizing a single or multiple flexible member to reduce an operational disturbance between a slider and a flexure nose portion of a head gimbal assembly in particular.

In general, embodiments of the present invention reduce the detrimental aspects of the flexure nose and gimbal vibrations within a hard disk drive by restricting nose and gimbal motion and/or dissipating vibration energy. For example, when a flying slider contacts disk asperities the impact energy can result in vibration of the flexure nose and gimbal. In some cases, the vibration of the flexure nose and gimbal reaches a resonance frequency resulting abnormal flying of the slider. By providing a semi-rigid, e.g., more flexible connection, between the slider and the flexure, operational disturbances are significantly reduced including impact transfer when the slider contacts the disk. Therefore, the recovery time from unstable to stable flight of the slider due to operational disturbance can be significantly reduced.

Other benefits of the flexible connection include reduction in pitch static attitude (PSA) change when the solder ball shrinks during termination, reduced excitation of the flexure nose frequencies and reduced flutter (side to side motion of slider) characteristics.

Figure 1:
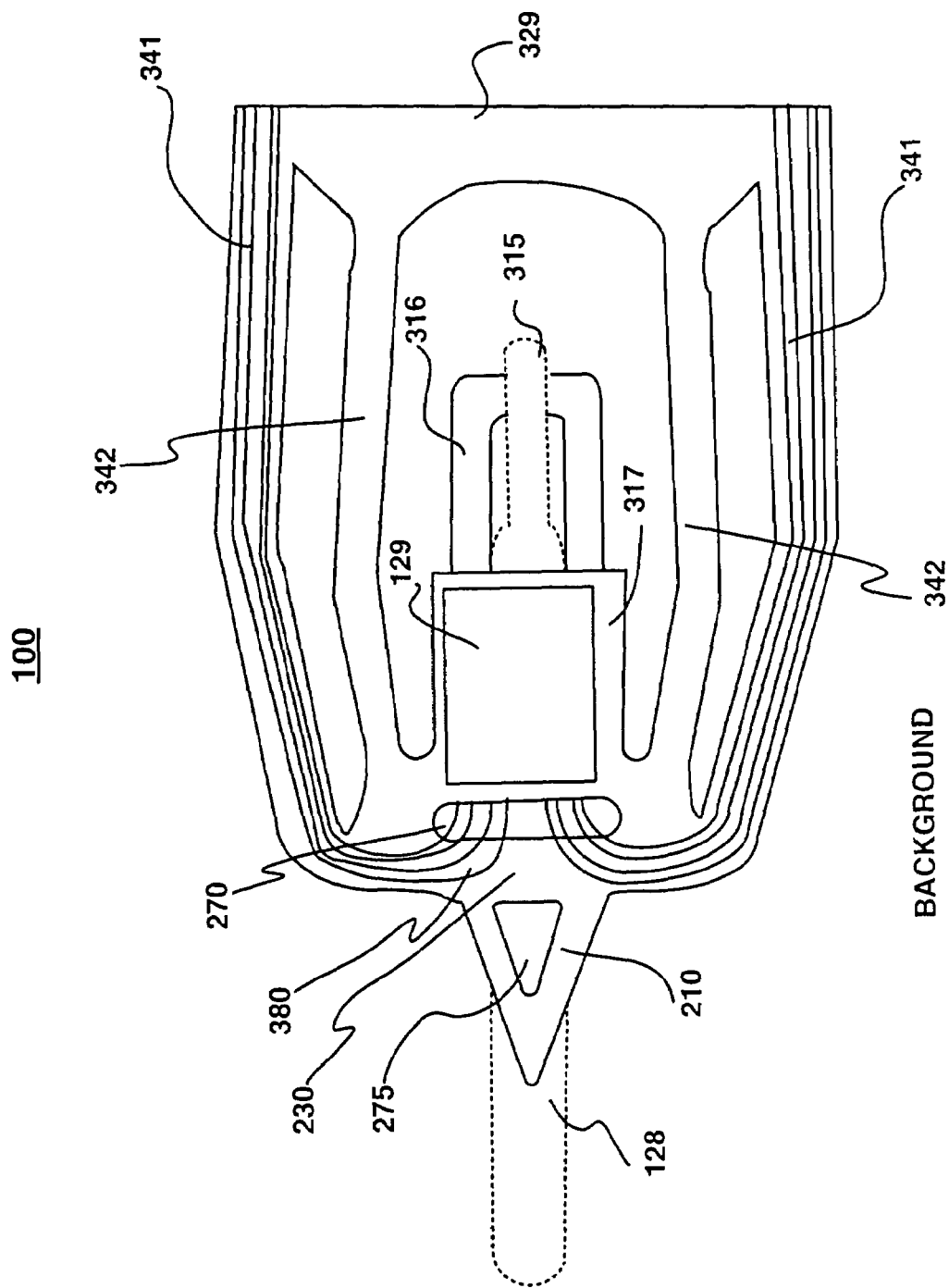
FIG. 1 is a bottom view of a background head gimbal assembly with a narrow gimbal window and flexible members held rigidly with stainless steel layer of the flexure.
Figure 2:
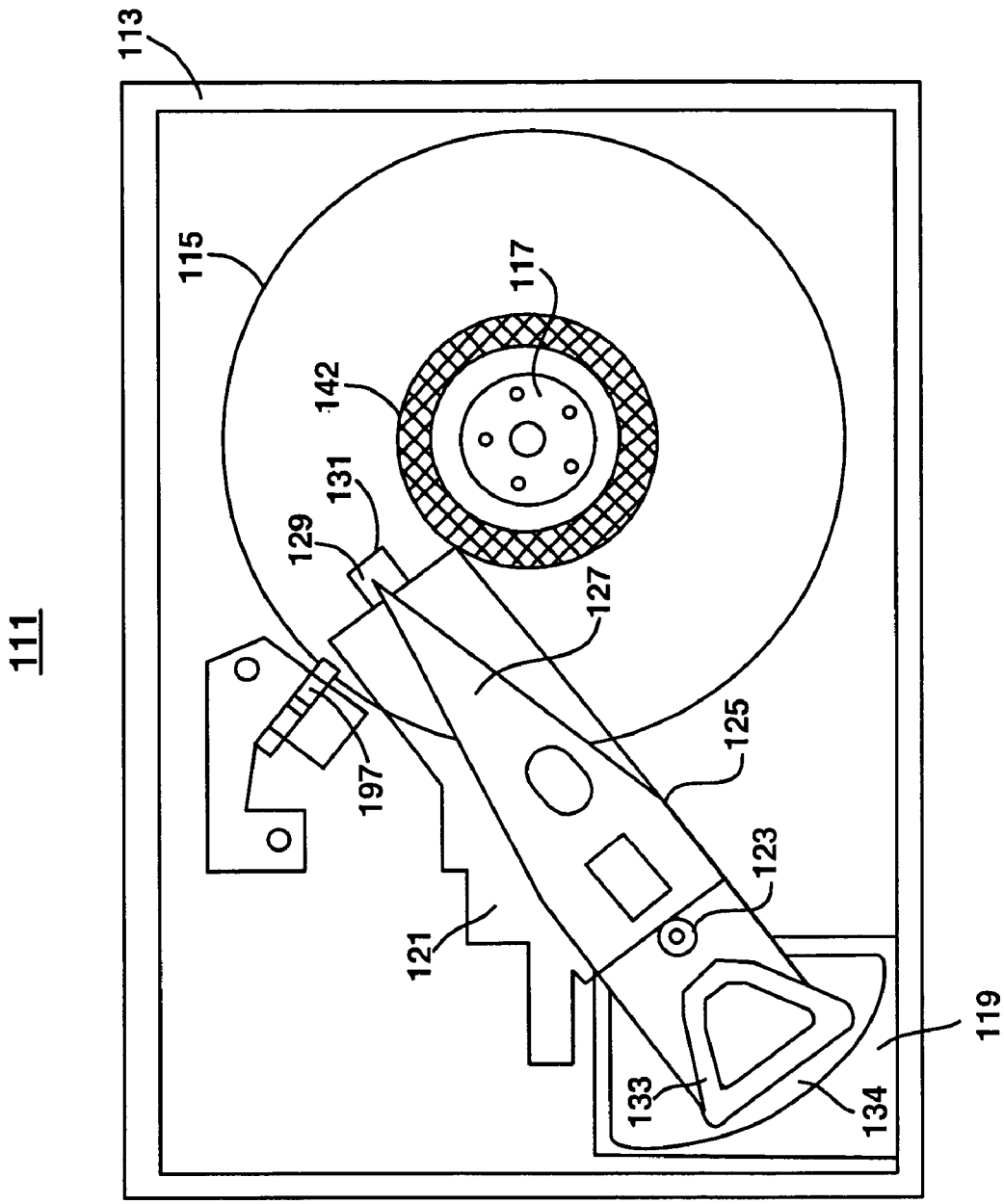
FIG. 2 is a schematic top plan view of a hard disk drive, in accordance with one embodiment of the present invention.

With reference now to FIG. 2, a schematic drawing of one embodiment of An information storage system comprising a magnetic hard disk file or drive 111 for a computer system is shown. Embodiments of the invention are well suited for utilization on a plurality of hard disk drives. The utilization of the driver of FIG. 2 is merely one of a plurality of disk drives that may be utilized in conjunction with the present invention. For example, in one embodiment the hard disk drive 111 would use load/unload (L/UL) techniques with a L/UL ramp 197 and a nose limiter. In another embodiment, the drive 111 is a non L/UL drive, for example, a contact start-stop (CSS) drive having a textured landing zone 142 away from the data region of disk 115.

In the exemplary FIG. 2, Drive 111 has an outer housing or base 113 containing a disk pack having at least one media or magnetic disk 115. A spindle motor assembly having a central drive hub 117 rotates the disk or disks 115. An actuator comb 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered ELS 127. It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 131 or head is mounted on a slider 129 and secured to a flexible structure called "flexure" that is part of ELS 127. The read/write heads magnetically read data from and/or magnetically write data to disk 115. The level of integration called the head gimbal assembly is the head and the slider 129, which are mounted on ELS 127. The slider 129 is usually bonded to the end of ELS 127.

ELS 127 has a spring-like quality, which biases or presses the air-bearing surface of the slider 129 against the disk 115 to cause the slider 129 to fly at a precise distance from the disk as the disk rotates and air bearing develops pressure. ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies. Movement of the actuator comb 121 by controller 119 causes the head gimbal assemblies to move along radial arcs across tracks on the disk 115 until the heads settle on their set target tracks. The head gimbal assemblies operate in a conventional manner and always move in unison with one another, unless drive 111 uses multiple independent actuators (not shown) wherein the arms can move independently of one another.

In general, the load/unload drive refers to the operation of the ELS 127 with respect to the operation of the disk drive. That is, when the disk 115 is rotating, the ELS 127 is unloaded from the disk. For example, when the disk drive is not in operation, the ELS 127 is not located above the disk 115 but is instead located in a holding location on L/UL ramp 197 away from the disk 115 (e.g., unloaded). Then, when the disk drive is operational, the disk(s) are spun up to speed, and the ELS 127 is moved into an operational location above the disk(s) 115 (e.g., loaded). In so doing, the deleterious encounters between the slider and the disk 115 during non-operation of the HDD 111 are greatly reduced. Moreover, due to the movement of the ELS 127 to a secure off-disk location during non-operation, the mechanical ship shock robustness of the HDD is greatly increased.

Figure 3:
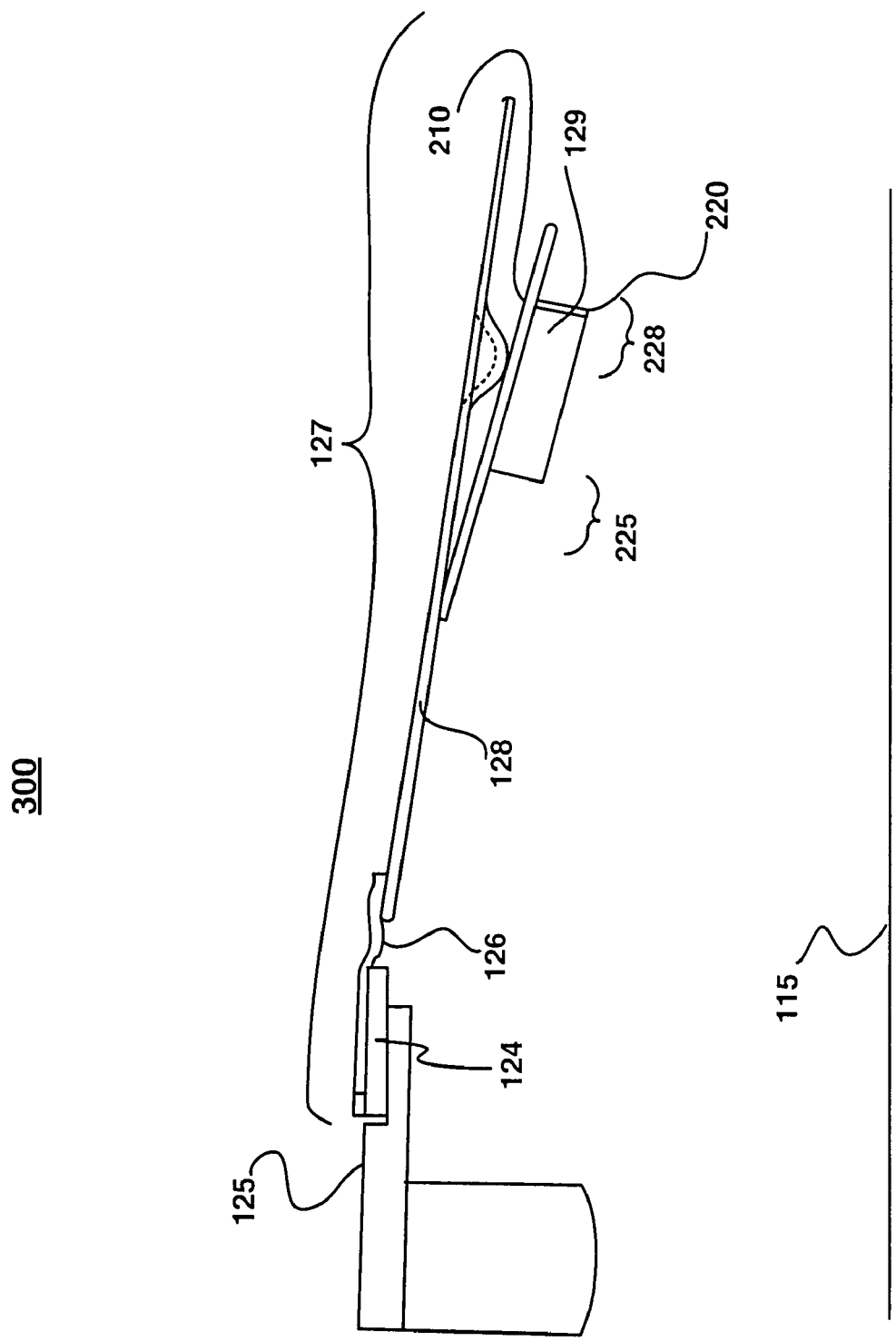
FIG. 3 is a side view of a typical head gimbal assembly of an actuator in accordance with one embodiment of the present invention.

Referring now to FIG. 3, a side view of a typical head gimbal assembly (HGA) 300 of an actuator is shown. The actuator arm 125 has extending from it at least one cantilevered ELS 127. An ELS 127 consists of a base plate 124, hinge 126, load beam 128 and electrical leads 341 and flexure 329 (shown in FIG. 3). Based on ELS design some of these components can be combined together into one integral piece. For example hinge 126 and load beam 128 can be one piece and electrical leads 341 and gimbal structure 329 can be one piece. A magnetic read/write transducer or head 220 is mounted on a slider 129 and is attached to flexible gimbal structure 329 of the ELS 127. The level of integration called the head gimbal assembly (HGA) is the slider 129 carrying head 220, which is mounted on ELS 127. The slider 129 has a leading edge (LE) portion 225 and a trailing edge portion (TE) 228. The LE and TE are defined by the airflow direction. That is, the air flows from the LE to the TE. Usually, the head 220 locates at the TE portion 228 of the slider 129. A portion of an exemplary disk 115 is also shown in FIG. 3 for purposes of clarity.

Figure 4:
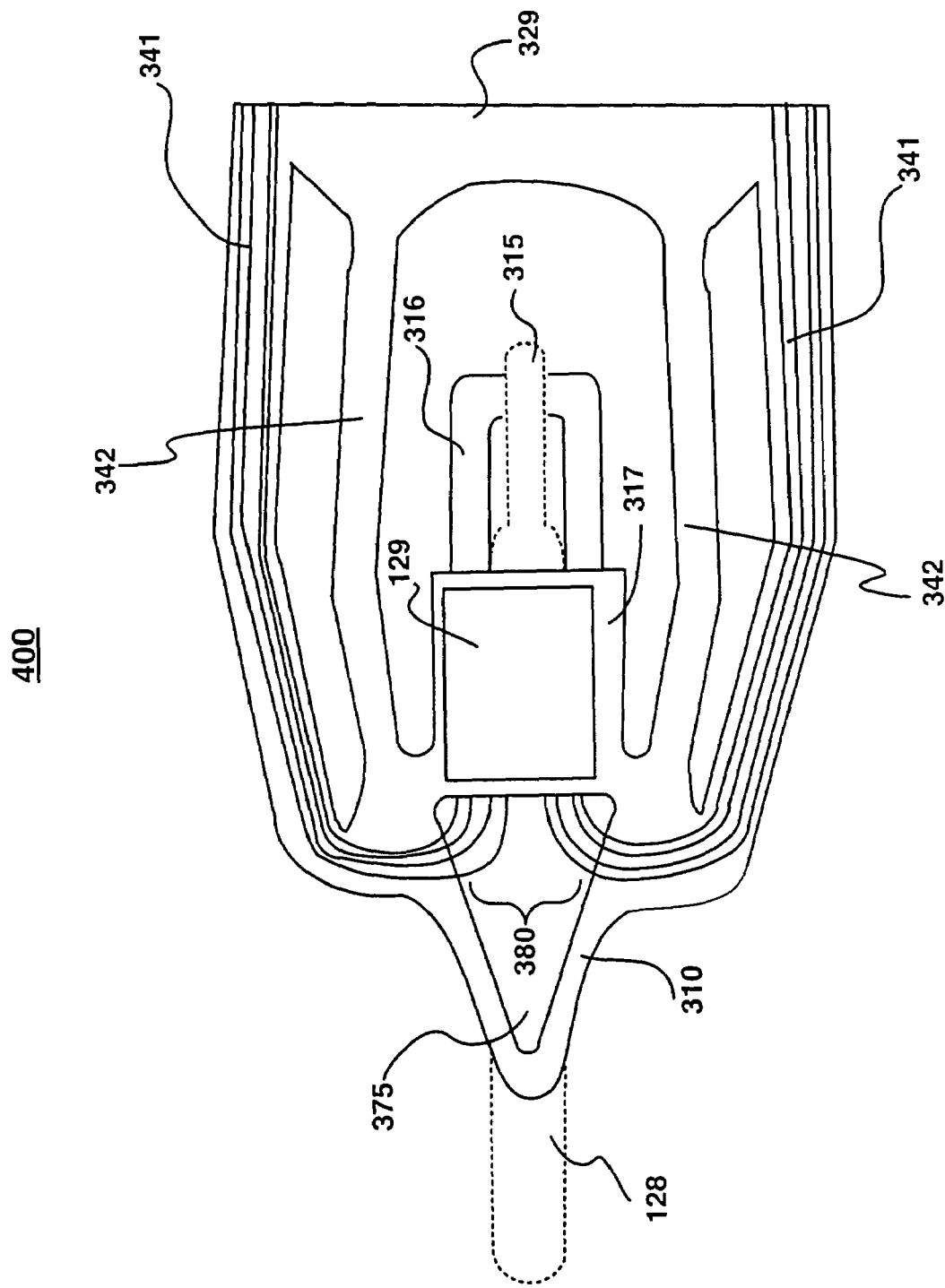
FIG. 4 is a bottom view of one exemplary head gimbal assembly with flexible members and gimbal window in accordance with one embodiment of the present invention.

With reference now to FIG. 4, a bottom view of an exemplary head gimbal assembly (HGA) 400 is shown in accordance with one embodiment of the present invention. In one embodiment, HGA 400 includes a slider 129 and gimbal structure (e.g., flexure) 329. In one embodiment, gimbal structure 329 includes a flexure tongue 317, a front limiter bar 316, two flexible legs 342, electric leads 341, and a wide base narrow width flexure nose limiter 310 with a very large gimbal window 375 in stainless steel layer. As is known in the art, gimbal structure 329 is utilized to flexibly suspend the head supporting slider 129 from the load beam 128. In general, the flexibility of the gimbal structure allows the slider 129 to remain flexible while flying above the disk 115. In so doing, the slider 129 will maintain a correct attitude over the disk 115 allowing the head 220 (of FIG. 3) to remain in correct alignment with the disk 115 such that the read/write capabilities of the head 220 remain constant.

Flexure nose limiter 310 is utilized during unload times of the disk drive. That is, when the ELS 127 is moved to a secure off-disk location on L/UL ramp 197 during non-operation, the flexure nose limiter 310 is utilized in conjunction with a staging platform to reduce unwanted motion of the gimbal structure 329. For example, on a HDD having a plurality of ELS 127, and therefore a plurality of HGA 300, during the unload state there is a need to support the gimbal structure 329 such that the sliders will not contact each other during movement of the HDD, or when the HDD experiences a shock event. By utilizing a staging platform having intimate contact with the flexure nose limiter 310, and a front limiter 315 contact with the front limiter bar 316, the deleterious movement of the gimbal structure 329 during unload times is greatly reduced. The front limiter 315 and staging platform (L/UL ramp 197) are well known in the art.

Referring still to FIG. 4, in one embodiment of the present invention, a large gimbal window 375 in the stainless steel layer of the flexure is provided between the slider 129 and the flexure nose limiter 310. To accomplish this, the flexure nose limiter 310 is widened at its base and outside walls are made thinner. This results in removal of rigid stainless steel from underneath the electric leads 341 making them flexible. Flexible electric leads 341 connect the slider to the gimbal nose and reduce the operational disturbance transfer. In one embodiment, the flexible member 380 is the same as the electric leads 341 from the terminal of the slider 129 to the flexure 329. By freeing a length of the leads 341 between the slider 129 terminals and the start of the flexure stainless steel support comprising gimbal structure 329, a semi-rigid, e.g., flexible, connection is provided between the slider 129 and the gimbal structure 329. The utilization of the flexible connection provides a significant reduction in impact transfer when the slider 129 contacts the disk 115. The flexible connection further provides a reduced PSA change during termination, e.g., because of solder ball shrinking. The flexible connection also reduces excitation and gain of dynamic modes of the flexure nose limiter 310 and reduces flutter characteristics for the HGA. All these characteristics help reduce part to part fly height variation.

In one embodiment, the gimbal window and flexible member are not added as new components during manufacture, but are instead formed during the standard manufacturing of the HGA 300. For example, typical ILS HGA designs have three main materials: stainless steel as a support structure, polyimide (e.g., a polymer) as an electric isolation layer, and copper traces as electric connections. On the surface of the copper traces, there might be a gold coating layer and or a cover coat (e.g., a cover layer) to provide further electric isolation and guard against oxidation (rusting) of the copper leads.

In addition, in one embodiment, during the gimbal window formation, the base of the flexure nose limiter 310 is made wider and its side walls are made thinner to reduce its mass to stiffness ratio and further enhance its dynamics characteristics like reduction in flutter and dynamic modes gain.

In another embodiment, the insulating polyimide layer is left inside the window to further reduce mass to stiffness ratio, dynamic flutter and dynamic modes gain in addition to providing support to free electric leads 341 during shock and handling to guard against any cracking or breakage.

In general, during manufacture, the shape of the ILS HGA is formed by etching each of the three (or more) layers of material thereby resulting in the final HGA design. Therefore, in one embodiment, in the area of the gimbal window 375 both the stainless Steel layer and the polyimide layer are etched away, but the copper layer traces are retained. By retaining the copper layer traces (e.g., flexible member 380) as the electrical leads 341, reduces operational disturbance transfer properties are realized between the slider 129 and the flexure nose limiter 310 without requiring additional manufacturing processes or materials. That is, the formation of the gimbal window 375, and the subsequent removal of any stainless steel support under the electrical leads 341 in the area of the flexible member 380 is performed without requiring additional material costs or adversely affecting the flying characteristics of the HGA 300. In another embodiment, the flexible member 380, (e.g., the electrical leads 341) is added as an additional manufacturing step.

Figure 5:
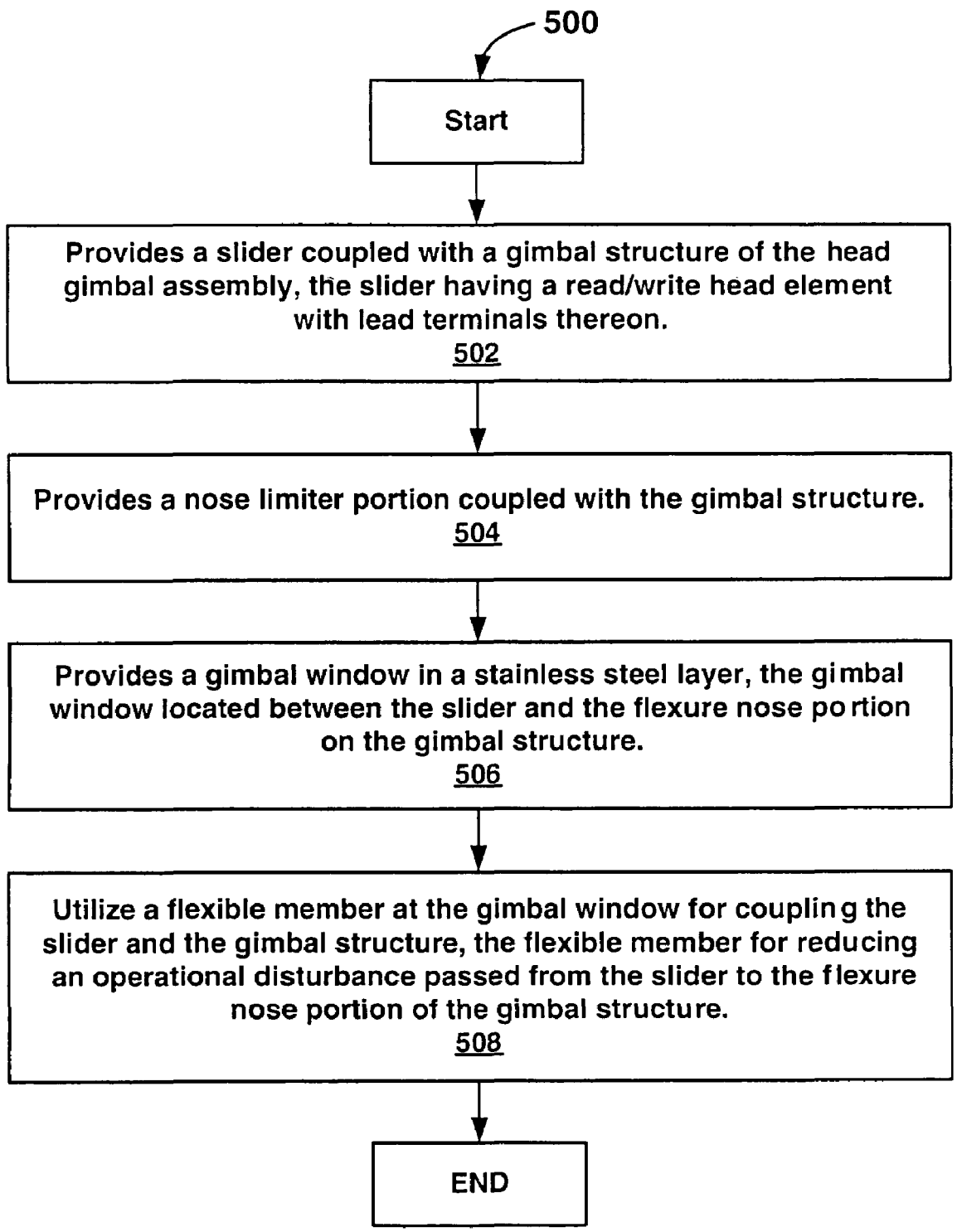
FIG. 5 is a flowchart of a method for utilizing a flexible member to reduce an operational disturbance between a slider and a flexure nose portion of a head gimbal assembly in accordance with one embodiment of the present invention.

Referring now to FIG. 5 and to FIG. 4, a flowchart 500 of a method for utilizing a flexible member to reduce an operational disturbance between a slider and a flexure nose portion of a head gimbal assembly is shown in accordance with one embodiment. In one embodiment, the hard disk drive is a contact drive, e.g., the head 220 is in contact with the disk 115. In another embodiment, the hard disk drive is a load/unload drive.

With reference now to step 502 of FIG. 5 and to FIG. 4, one embodiment provides a slider 129 coupled with a gimbal structure 329 of the HGA 300, the slider 129 having a read/write head element with lead terminals thereon. In one embodiment, the head 220 is a portion of a contact recording system. That is, the head 220 is brought to "ground zero" or into contact with the disk it is over flying. In another embodiment, the head 220 has a tight aerial density and is not in contact with the disk 115 it is over flying, but is hovering just above the disk 115. In other words, although the head 220 is not designed to be in contact with the disk 115, due to the closeness with which it is flying with respect to the disk 115, intermittent contact will occur.

Referring now to step 504 of FIG. 5 and to FIG. 4, one embodiment provides a flexure nose limiter 310 coupled with the gimbal structure 329 of the HGA 400. As described herein, the flexure nose limiter 310 is utilized during the unloading stage of the hard disk drive to provide a safe resting location for the HGA 300.

With reference now to step 506 of FIG. 5 and to FIG. 4, one embodiment provides a gimbal window 375 located between the slider 129 and the flexure nose limiter 310 on the gimbal structure 329. In general, the gimbal window 375 is a hole formed in the gimbal structure 329 to reduce the coupling between the slider 129 and the flexure nose limiter 310. In one embodiment, the formation of the gimbal window 375, and the subsequent removal of any stainless steel support under the electrical leads 341 in the area of the flexible member 380 is performed without requiring additional material costs or adversely affecting the flight characteristics of the HGA 400.

With reference now to step 508 of FIG. 5 and to FIG. 4, one embodiment utilizes a flexible member 380 at the gimbal window 375 for coupling the slider 129 and the gimbal structure 329 for reducing an operational disturbance passed from the slider 129 to the flexure nose limiter 310 of the gimbal structure 329. As described herein, the utilization of flexible member 380 provides a reduction in hysteresis (e.g., HGA 300 returning to the same fly height after contact with disk 115), lower PSA change, lower dynamic frequency gain and reduced flutter.

In one embodiment, the flexible member 380 is a portion of the electrical lead 341 provided during the subtractive ILS manufacturing process. In another embodiment, the flexible member 380 is a portion of the electrical lead 341 provided during the additive CIS manufacturing process. Therefore, the manufacturing of the HGA 300 including the flexible member 380 and the gimbal window 375 requires no additional materials or steps. In other words, the flexible member 380 and the gimbal window 375 are added (or masked during the removal process) to form the desired flexure nose limiter 310/slider 129/flexible member 380 structure.

Removing portions of the stainless steel layer of the flexure 329 to form the gimbal window 375 and utilizing the electrical leads 341 as the flexible member 380 achieve pluralities of benefits. Specifically, the unsupported length of the leads 341 between the solder joint and start of stainless support which comprises gimbal structure 329 is more flexible and greatly reduces slider 129/disk 115 impact transfer to gimbal structure 329. The reduced energy transfer results in reduced dynamic coupling between the slider 129 and the flexure nose limiter 310. The reduced energy transfer further results in reductions in flutter and fly height hysteresis.

Moreover, due to the flexible electric leads 341 at the termination of the slider 129, during the solder ball bonding process, e.g., soldering the electrical leads 341 to the terminal pads on the slider 129, PSA is reduced. That is, during the solder bond process, the solder will shrink as it cools. The shrinking of the solder balls is not uniform and in the prior art, on a four lead slider, the non-uniform shrinkage can result in forces on the leads that in turn pull and deform the flexure tongue carrying the slider resulting in a PSA shift of greater than one degree. However, in one embodiment, because the terminal pads and a significant portion of the electrical leads 341 form a flexible connection, e.g., have no supporting structure associated therewith, the shrinking of the solder does not provide a significant force resulting in a PSA shift of less than 0.2 degrees. That is, since the electric leads 341 are flexible, the connection absorbs the forces related to the solder shrinkage and does not pass them on to any portions of the HGA 300.

Thus, embodiments of the present invention provide a method and system for utilizing a flexible members to reduce an operational disturbance between a slider and a flexure nose portion of a head gimbal assembly. Additionally, embodiments provide a method and system for utilizing a flexible member to reduce an operational disturbance between a slider and a flexure nose portion of a head gimbal assembly that significantly reduce operational disturbances encountered by the slider. Moreover, embodiments provide a method and system for utilizing a flexible member to reduce an operational disturbance between a slider and a flexure nose portion of a head gimbal assembly that is compatible with present manufacturing techniques resulting in little or no additional costs.

While the method of the embodiment illustrated in flowchart 500 shows specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention are thus described. While the present invention has been described in particular embodiments, it should be appreciated that the present invention should not be construed as limited by such embodiments, but rather construed according to the below claims.

What is claimed is:

1. A method for reducing an operational disturbance of a head gimbal assembly comprising:
   providing a slider coupled with a gimbal structure of said head gimbal assembly, said slider having a read/write head element with lead terminals thereon;
   providing a flexure nose limiter coupled with said gimbal structure;
   providing a single gimbal window comprising a stainless steel layer, said single gimbal window located between said slider and said flexure nose limiter on said gimbal structure; and
   utilizing a flexible member at said single gimbal window for coupling said slider and said gimbal structure, said flexible member for reducing an operational disturbance passed from said slider to said flexure nose limiter of said gimbal structure.

2. The method of claim 1 further comprising:
   utilizing copper traces as said flexible member for coupling the slider with the gimbal structure.

3. The method of claim 1 further comprising:
   utilizing an insulating polyimide layer as a flexible member for coupling the slider with the gimbal structure.

4. The method of claim 1 wherein reducing said operational disturbance comprises:
   utilizing said flexible member for decreasing impact energy transfer from said slider to said flexure nose limiter of said flexure when said slider contacts a disk.

5. The method of claim 1 wherein reducing said operational disturbance comprises:
   utilizing said flexible member for decreasing pitch static attitude (PSA) change between said slider and said gimbal structure due to a solder ball shrinkage at said lead terminals.

6. The method of claim 1 wherein reducing said operational disturbance comprises:
   utilizing said flexible member for reducing slider induced excitation of said flexure nose limiter and gain of dynamic modes thereby decreasing fly height hysteresis of said head gimbal assembly.

7. The method of claim 1 wherein reducing said operational disturbance comprises:
   utilizing said flexible member for decreasing flutter transfer from said flexure nose limiter of said gimbal structure to said slider.

8. The method of claim 1 wherein forming said single gimbal window further comprises:
   reducing the mass to stiffness ratio of said stainless steel forming said flexure nose limiter of said gimbal structure, said lower mass to stiffness ratio reducing providing reduced vibration characteristics of said flexure nose limiter.

9. A hard disk drive comprising:
   a housing;
   at least one disk mounted to the housing;
   an actuator mounted to the housing and being movable relative to the at least one disk, the actuator having a suspension for reaching over the disk, the suspension having a head gimbal assembly thereon, said head gimbal assembly further having a gimbal structure operable for reducing an operational disturbance transfer and amplification between a slider and a flexure nose of said gimbal structure comprising:
   a slider coupled with said gimbal structure of said head gimbal assembly, said slider having a read/write head element with lead terminals thereon;
   a flexure nose limiter coupled with said gimbal structure;
   a single gimbal window in a stainless steel layer, said single gimbal window located between said slider and said flexure nose on said gimbal structure; and
   a flexible member at said single gimbal window operable for coupling said slider with said gimbal structure whereby:
   a transfer of impact energy from said slider to said flexure nose is reduced;
   a change in pitch static attitude due to solder ball shrinkage is decreased;
   a fly height hysteresis of said head gimbal assembly is reduced; and
   a transfer of flutter from said gimbal structure to said slider is reduced.

10. The flexible member of claim 9 comprising:
    copper traces operable for coupling the slider with the gimbal structure.

11. The hard disk drive of claim 9 further comprising a load/unload hard disk drive assembly.

12. A head gimbal assembly comprising:
    a slider coupled with a gimbal structure of said head gimbal assembly, said slider having a read/write head element with lead terminals thereon;
    a flexure nose limiter coupled with said gimbal structure;
    a single gimbal window comprising a stainless steel layer, said single gimbal window located between said slider and said flexure nose limiter on said gimbal structure; and
    a flexible member at said single gimbal window for coupling said slider and said gimbal structure, said flexible member for reducing an operational disturbance passed from said slider to said flexure nose limiter of said gimbal structure.

13. The flexible member of claim 12 wherein said flexible member utilizes a copper trace for coupling the slider with the gimbal structure.

14. The flexible member of claim 12 wherein said head gimbal assembly is a portion of a load/unload hard disk drive assembly.

15. The flexible member of claim 12 wherein said operational disturbance is pitch static attitude (PSA) change between said slider and said gimbal structure due to a solder ball shrinkage at said lead terminals.

16. The flexible member of claim 12 wherein said operational disturbance is slider induced excitation of said flexure nose limiter and gain of dynamic modes thereby decreasing fly height hysteresis of said head gimbal assembly.

17. The flexible member of claim 12 wherein said operational disturbance is flutter transfer from said gimbal structure to said slider.

* * * * *